Patented Jan. 2, 1923.

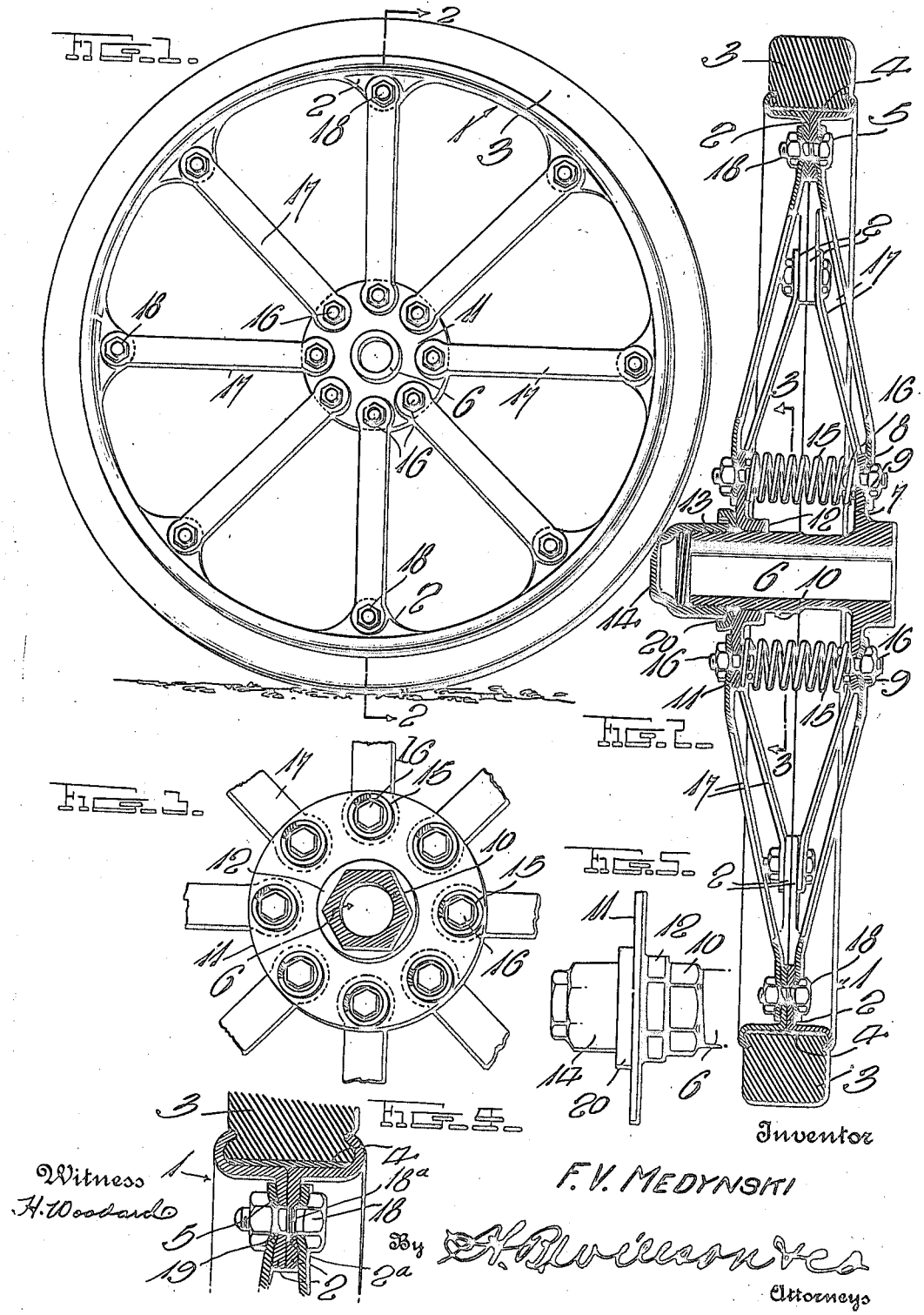

1,440,479

UNITED STATES PATENT OFFICE.

FRED VINCENT MEDYNSKI, OF MEDFORD, OREGON.

RESILIENT WHEEL.

Application filed April 17, 1922. Serial No. 553,451.

*To all whom it may concern:*

Be it known that I, FRED VINCENT MEDYNSKI, a citizen of the United States, residing at Medford, in the county of Jackson and State of Oregon, have invented certain new and useful Improvements in a Resilient Wheel; and I do declare the following to be a full, clear, and exact description of the invention, such as will enable others skilled in the art to which it appertains to make and use the same.

This invention relates to an improved resilient wheel for use on motor vehicles, the same being especially designed to take the place of the types of wheels now used so as to permit pneumatic tires to be entirely dispensed with.

The principal object of the invention is to generally improve upon wheels of this class by providing one of comparative simplicity, the same being strong and durable and such in construction that it assists and acts in conjunction with the springs in effectively absorbing the shocks to which the vehicle is subjected when traveling over obstructions in the path of travel.

More specifically speaking, it is another object of the invention to provide a resilient wheel embodying a tire-carrying rim on which a tire is mounted, with resilient spokes connected with this rim, the spokes being connected at their inner ends with a shock absorbing hub of unique and novel construction.

A further object of the invention is to associate with the novel hub, means for enabling the spokes to be moved toward each other and held to compress the springs slightly so as to permit convenient removal and replacement of damaged spokes and to facilitate application or removal of the tire.

Other objects and advantages of the invention will be apparent during the course of the following description.

In the accompanying drawings forming a part of this specification and in which like numerals are employed to designate like parts throughout the same:

Figure 1 is a side elevational view of a spring wheel constructed in accordance with this invention.

Figure 2 is an enlarged central vertical sectional view of the wheel.

Figure 3 is a detail view taken on the line 3—3 of Figure 2.

Figure 4 is an enlarged detail sectional view showing the preferred manner of connecting the spokes with the rim.

Figure 5 is a detail view showing the construction of the hub more clearly, some of the spokes being removed for the sake of clearness.

In the drawings, the numeral 1 designates a circumferentially slit rim having a plurality of circumferentially spaced flanges 2 projecting inwardly from its inner periphery, these flanges being formed with aligned openings which serve a purpose to be hereinafter described. It is to be noted that the openings in the flanges of the inner rim section are threaded as at $2^a$. The rim 1 is intended to accommodate a solid or any other kind of a tire 3 and if it is desired, a suitable lining 4 may be placed between the tire and the rim to protect the tire against excessive wear. It may be conveniently mentioned here that the flanges 2 have concavities 5 formed in their outer faces and surrounding the apertures, and these concavities serve a purpose made apparent in the following description.

As before indicated, the improved wheel includes a novel hub which is constructed to absorb shocks to which the vehicle is subjected when passing over rough places in path of travel. The hub preferably includes a tubular part 6 which is formed at one end with an integral circular flange 7 provided adjacent its periphery with a plurality of bolt holes 8. In the outer face of the flange 7 and around the holes, other concavities 9 are formed. Referring now to the opposite ends of the tube 6 it will be seen that this is equipped with a flat-faced portion 10 on which a disk 11 is slidable. The disk at its center is formed with an inwardly extending part 12, the inner face of which is flat-faced to accommodate the flat-faced portion of the tubular part 6. By maintaining the disk 11 against rotation, an equal tensile strain on all of the spokes is insured. That portion of the hub beyond the part 6, is externally screw-threaded as indicated at 13 to accommodate an internally screw-threaded hub-cap 14. To absorb the shocks, I make use of a plurality of relatively short coiled springs 15 interposed between the flange 7 and the slidable disk 11. It is to be noted that the end-coils of the several springs are clamped between the heads of the fastening bolts 16 and are thus held in place. These bolts 16 serve primarily as means for securing the inner ends of the resilient spokes 17 with the flange and movable disk respectively. At their outer ends, the spokes are connected with the aforesaid flanges 2 by means of other bolts 18 which pass thru the aligned holes in the spokes and flanges. As shown, the intermediate portions of the shanks of the bolts are formed with screw-threads 18$^a$ engaged with the aforesaid threads 2$^a$ to hold the inner rim-sections and spokes intact while removing or replacing the tire. Although the threads 18$^a$ are simply shown as being at the center of the bolt-shanks, it is understood that they may extend entirely to the heads of the bolts if desired. It is to be noted that the spokes are provided with concavo-convex portions 19 at their opposite ends for coaction with the several concavities formed in the flange 7, flanges 2, and movable disk 11. It should also be noted that the head and nut of the fastenings 16 and 18 are shaped to effectively retain the especially shaped ends of the bolts in the conical cavities of the parts mentioned.

It has been before intimated that means is employed for moving the disk 11 toward flange 7 to compress the springs 15 and to hold them in such condition so as to relieve the spokes of excessive pressure to enable any of them to be replaced. This is also advantageous in that it aids in enabling the spokes on one side to be detached from their respective flanges to permit the outer rim section to be removed for applying or removing the tire. Although the means could be of some other construction, it preferably comprises a cup-shaped washer 20 which is interposed between the hub-cap 14 and the movable disk 11. By using such a washer and disposing it as shown, it is unnecessary to make use of a specially designed hub-cap. It is obvious that by screwing the cap against the washer, the disk 11 will be moved inwardly toward the stationary flange 7 and the springs between these parts compressed to change the divergence of spokes and to relieve them of the pressure ordinarily exerted against them by these springs. Hence, it will be an easy matter to remove one or more of the spokes or to disconnect them at the outer ends from the rim to permit one of the rim sections to be removed.

The operation of the improved wheel is as follows: Assuming that an obstruction in the path of the travel is encountered, it will be seen that the hub, as a unit, will move downwardly toward the ground. In so doing, the pairs of spokes then beneath the vehicle chassis will flex, while the upper sets of the spokes will approach each other and suspend the weight or load, and all spokes will then act in conjunction to compensate the action of the hub. While the hub is thus moving downwardly, the change in divergence of the upper set of spokes will act to move these spokes together and in turn will slide the movable disk toward the stationary flange against the action of coiled springs located between these two parts. Consequently, the springs will be permitted to absorb the shock, will tend to prevent violent rebound, and will function to automatically return the parts to their normal condition.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A spring wheel comprising a hub including a tubular part having an external flat-faced portion adjacent one end, being provided at its opposite end with a laterally disposed integral spoke anchoring flange; a spoke anchoring disk having a non-circular opening at its center slidably mounted on the flat-faced portion of said tubular part; a tire supporting rim, a plurality of flexible spokes connected at their opposite ends with the rim, flange and disk; and spring means arranged between and coacting with the disk and flange for absorbing the shocks to which the vehicle is subjected.

2. A spring wheel for vehicles comprising a hub including apertured spoke anchoring members, one being movable towards and away from the other, a rim, a plurality of spokes connected at their outer ends with the rim, being apertured at their inner ends, springs interposed between said spoke anchoring members, and bolts passing through the apertures in the spokes and said last named members, the heads of said bolts coacting with the end-coils of said springs to secure them to said members.

3. In a resilient wheel, a hub including axially aligned apertured plates, one being movable toward and from the other, a rim, spring metal spokes connected with said rim and said plates, springs for forcing the movable plate away from the other, and adjustable pressure resisting means cooperative with one of said plates to move it toward the other plate and hold it in such position while one of the tires or one of the spokes are being removed.

4. A resilient wheel comprising a hub including apertured plates, one being movable toward and from the other, a circumferentially divided rim including juxtaposed inwardly extending flanges provided with apertures, pairs of spokes secured to and radiating from said plate, said spokes having apertures at their outer ends, the spokes of each pair being inwardly divergent and having apertures registering with the apertures in the aforesaid flanges, bolts passing through the registering apertures for removably securing the spokes to the rim, spring means for forcing the movable plate away from the other, and pressure resisting means for moving the movable plate toward the other to relieve the spokes of excessive spring pressure, whereby to facilitate the application and removal of a tire.

5. A resilient wheel comprising a hub and including a tubular part having an integral flange at one end and provided with external screw threads at its opposite ends, a disk slidably mounted on said tubular part and spaced from said flange, a freely slidable cup-shaped washer bearing against said disk, and means cooperable with said screw threads and engaging said washer to move said disk toward the flange, and springs arranged between said flange and said disk to be compressed when said disk approaches the flange.

In testimony whereof I have hereunto set my hand.

FRED VINCENT MEDYNSKI.